Figure 1:
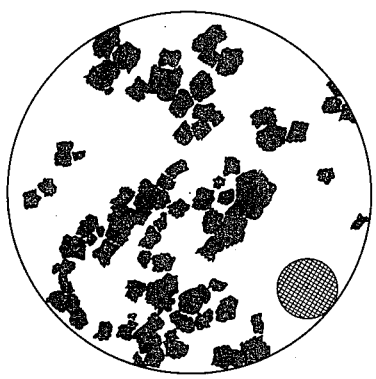

May 16, 1961     G. B. ALEXANDER ET AL     2,984,628
CONCENTRATED ZIRCONIA AND HAFNIA AQUASOLS AND THEIR PREPARATION
Filed Nov. 29, 1956

INVENTORS
GUY B. ALEXANDER
JOHN BUGOSH
BY Albert B. Griggs
ATTORNEY

United States Patent Office 2,984,628
Patented May 16, 1961

2,984,628
CONCENTRATED ZIRCONIA AND HAFNIA AQUA-SOLS AND THEIR PREPARATION

Guy B. Alexander and John Bugosh, Wilmington, Del., assignors to E. I. du Pont de Nemours and Company, Wilmington, Del., a corporation of Delaware Filed Nov. 29, 1956, Ser. No. 625,188

10 Claims. (Cl. 252—313)

This invention relates to zirconia and hafnia sols and is more specifically directed to concentrated zirconia sols and hafnia sols in which the percent solids in the dispersed phase is at least 30. The invention relates further to the preparation of such sols by autoclaving an aqueous solution of a basic zirconium or hafnium salt.

Figure 2:
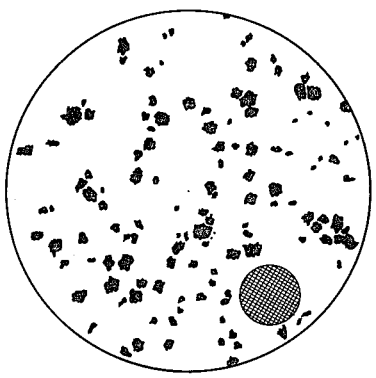

In the drawing:

Figure 1 is a pen and ink representation of a portion of an electron micrograph, magnification 50,000, of a product of Example 4, and Figure 2 is a similar representation of the product of Example 2.

Starting material

According to the invention a sol of an oxide of a metal selected from the group consisting of zirconium and hafnium is prepared by hydrolysis.

In processes of the invention an aqueous solution of a basic zirconium or hafnium salt is heated under pressure.

There can be used, for example, zirconium oxychloride, $ZrOCl_2 \cdot 8H_2O$, sometimes called zirconyl chloride or basic zirconium chloride. Zirconium oxynitrate, $ZrO(NO_3)_2 \cdot 2H_2O$ can similarly be used. The zirconium oxychloride is preferred. Broadly, basic zirconium salts can be used in which the anion corresponds to a strong acid and is mono-basic. Thus, the anion can be that of strong monobasic acids, namely, those which have a dissociation constant greater than 0.1 at 25° C.

The basicity of the basic zirconium salt used can vary. The mol ratio of anion:zirconium can vary, broadly, from 0.5:1 to 4:1. More specifically, it is preferred to use mol ratios between 1:1 and 2:1. The degree of hydration of the basic zirconium salt can also vary widely.

For purposes of the invention it is important only that an aqueous system be prepared which contains zirconyl ions, $ZrO^{++}$, which can then be hydrolyzed to produce zirconia according to the invention. The concentration of zirconyl ion in an aqueous system to be treated according to the invention can vary up to about 4 molar. A sufficient amount of the soluble basic zirconium compound should be used to produce this concentration of zirconyl ion. More specifically, it is preferred to use aqueous solutions in which the content of zirconyl ion ranges from 0.1 to 2 molar.

When a zirconyl salt solution is autoclaved to effect hydrolysis according to processes of the invention, one may obtain either a turbid sol or a white precipitate. The latter can readily be peptized as will be shown hereinafter.

Factors which govern whether the product will be a turbid sol or a white precipitate are interrelated and are (a) temperature of autoclaving, (b) concentration of zirconium salt, (c) time of autoclaving, (d) the zirconium to anion ratio in the salt, and (e) the presence of impurities. Conditions for preparing sols and peptizable precipitates are illustrated in the examples and it will there be seen that there is no sharp line of division between these products which, upon superficial examination, appear quite different.

The remarks above concerning zirconium compounds are equally applicable to the corresponding hafnium compounds.

Hydrolysis

According to the invention a zirconyl salt solution, for example, is heated at a temperature from about 120 to 300° C. It is specifically preferred to use temperatures between 120 and 150° C. As the solution is heated the zirconyl salt is hydrolyzed to form zirconia particles and acid. The heat treatment should continue until the hydrolysis is substantially complete though in most processes of the invention no great harm is done if some unhydrolyzed zirconyl salt remains. At 125° C. about one hour is sufficient to effect substantially complete hydrolysis of zirconyl chloride.

The time of heating, as is common in hydrolysis reactions, will depend upon the temperature and other specific conditions but in general will require from about one minute to 10 hours. Under ordinary conditions of operation a time of heating from about 1 to 4 hours will be sufficient to effect substantially complete hydrolysis. Whatever the conditions of hydrolysis, the progress can be checked from time to time until the desired degree of hydrolysis is attained.

It is preferred to effect the hydrolysis with as few impurities as is commercially practicable. The presence of fluoride, silica, or tartrate tends to cause the formation of undesired gel particles in which the per cent of solids in the dispersed phase is much less than 30. In addition to using relatively pure materials, it is desirable to avoid the introduction of excess impurities over those unavoidable in commercial practices. Thus, it is preferred that the autoclave in which the hydrolysis is effected should be constructed of a material not rapidly attacked by the aqueous system being heated. The hydrolysis can suitably be effected in such materials as those made of or lined with "Hastelloy" alloy C glass, or platinum.

Again while the discussion under the above heading is directed to zirconium compounds, precisely the same considerations are applicable to hafnium compounds.

Separation of excess acid

Products prepared as above described will contain an excess of acid over that normally wanted. It will ordinarily be desired therefore to remove at least a part of the acid.

If the product is comparatively dilute and is in the form of a sol, the acid can be removed by such conventional methods of dialysis, precipitation, ion exchange or, depending upon the acid, distillation. The precipitation method can be followed with hydrochloric acid, for example, by using silver oxide to form an insoluble silver chloride. Other acids can similarly be removed by the addition of materials which form insoluble precipitates.

The removal of acid from the zirconia and hafnia sols can be effected using a procedure as described in Rule U.S. Patent 2,577,485, column 8, beginning at line 46. Various anion exchangers are there described and references are made to the literature.

The excess acid is preferably removed to such a point that the final pH is in the range of 2 to 6. It is more specifically preferred to use a pH from 3 to 5.

After removal of acid the sols can be concentrated by evaporation. The extent to which they can be concentrated and still remain as fluid materials will depend in part upon the particle size. Sols with particles around 5 millimicrons can be concentrated to about 25 percent $ZrO_2$ or $HfO_2$. Sols containing larger particles, say, 100 millimicrons or more, can be concentrated to as much as 50 percent $ZrO_2$ or $HfO_2$. If the sols are concentrated beyond the ranges stated, they become viscous and may even become paste-like. However, on dilution with water, the viscosity will decrease.

If the autoclaving and hydrolysis was conducted on a rather concentrated solution, and particularly at the higher temperatures and for longer periods of time, the product of hydrolysis will be a precipitate. In this event it is noteworthy that the zirconium oxide or hafnium oxide content is almost entirely in the precipitated phase and virtually none is present in the supernatant liquid.

Supernatant liquid can be removed from such precipitates by filtration or by centrifuging to obtain a wet cake consisting of approximately 60 percent water and 40 percent $ZrO_2$ or $HfO_2$, the amount differing somewhat depending upon the specific conditions of centrifuging and the specific composition. The wet cake contains a considerable amount of acid and this can be removed by washing or by any of the methods above described such as ion exchange.

After the excess acid is removed, as by ion exchange, to give a product in the pH range above indicated, a precipitated zirconia or hafnia peptizes and upon standing forms sols which are very similar to or identical with those which can be prepared by hydrolyzing a dilute solution, deionizing, and concentrating by evaporation as above outlined.

The aquasols prepared as above described can be converted to organosols which can contain more or less water as desired. The sols can be transferred to organic solvents by mixing them with a solvent which forms an azeotrope with water and removing the water by azeotropic distillation. It is preferred to use polar, water-miscible organic solvents. Preferred solvents include normal propanol and glycol.

The organosols can be concentrated to form very thick dispersions or even pastes. They can be completely dried to produce dry powders which can readily be dedispersed either in organic or aqueous solvents. When thus dried there is relatively little permanent aggregation of the particles. The organic solvent can, if desired, be removed above the critical pressure to produce products which are somewhat more voluminous.

The zirconia or hafnia particles can also be dried from water or from aqueous systems. There is somewhat more aggregation when the sols are dried from water but the dried products can be redispersed in water or in a suitable organic material.

*Product characterization*

The sols and dry dispersible powders of the invention are characterized by containing ultimate zirconia or hafnia particles which are at least 5 millimicrons in diameter and which are in the colloidal size range and which additionally are dense. Thus the particles can range in size between 5 millimicrons and the upper limit of colloidal size, about 150 millimicrons. More broadly, the particle size can range upwardly to 200 millimicrons in diameter. At this dimension there will be a considerable tendency for the particles to settle.

The ultimate particle size of the individual zirconia and hafnia particles, which may occur as loose aggregates in sols or powders to be used in compositions of the invention, are best determined by nitrogen surface area determination, although their general character may be ascertained by use of the electron microscope.

When the products are prepared at above 150° C. the particles and particularly their aggregates will be found to be irregular in shape. By electron diffraction the zirconia particles show a pattern similar to the mineral baddeleyite. When the products are prepared at temperatures below 150° C. the particles are amorphous.

In referring to the ultimate particles as having a diameter of 5 millimicrons, for example, it is intended to refer to the smallest average dimension of the ultimate particle. Also, in speaking of the particles as having a certain diameter, it is intended, as will be apparent, to refer to the average diameter of all particles in the sol or product.

As indicated above the particle size and character of the sols and dry powders can be defined by nitrogen adsorption. A method for determining nitrogen adsorption is described in "A New Method for Measuring the Surface Areas of Finely Divided Materials and for Determining the Size of Particles," by P. H. Emmett, in "Symposium on New Methods for Particle Size Determination in the Subsieve Range" in the Washington Spring Meeting of A.S.T.M., March 4, 1941. The sol to be measured is deionized, transferred to propanol by distillation, and dried in a vacuum oven.

Sols and powders of the invention are composed of zirconia or hafnia particles which have a specific surface area of 5 to 400 m.²/g. as measured by nitrogen adsorption.

The preferred zirconia and hafnia particles are in the size range of 5 to 25 millimicrons. The surface area of the particles in m.²/g., A, is related to the average diameter, D, as measured by electron micrograph by the range $$A = \frac{1000}{D} \text{ to } \frac{2000}{D}$$

for zirconia particles. Because of the higher density of $HfO_2$, the relationship is $$A = \frac{600}{D} \text{ to } \frac{1200}{D}$$

The particles of the sols and dry powders of the invention are further characterized in that the percent of solids in the dispersed phase, as in a sol, is at least 30. The dry powders must be dispersed in a suitable medium to effect this measurement, preferably water, at pH 2.5 to 4 and containing chloride as a stabilizer. It is preferred that the percent of solids in the dispersed phase be at least 50. This figure for the percent of solids in the dispersed phase reflects the fact that the products are very dense and contain less water within and upon the zirconia or hafnia particles than particles of sols which are spongy and gel-like, and are prone to ready gelation.

The figure just described can be computed from the following series of relations:

The relative viscosity $N_r$ of zirconia or hafnia sols can be determined from the drain time of the sol, $t_s$, and the drain time of water, $t_w$, in an Ostwald pipette, and the specific gravity of the sol, $d$, (1) $$N_r = \frac{t_s d}{t_w}$$

Mooney (J. Colloid Sc., 6: 162–170, 1951) has developed the relationship between viscosity and the percent solids in the dispersed phase for spherical colloidal particles:

(2) $$\ln N_r = \frac{2.5c}{1 + 1.43c}$$

where ln $N_r$ is the natural logarithm of $N_r$, the relative viscosity of a colloidal sol. In the relation $c$ is the fraction of the total volume which is occupied by the viscosity creating phase. Although the colloidal zirconia or hafnia particles described herein are not spherical, one can calculate a relative value of $c$ using the above Mooney equation and from this one can obtain a relative estimate of the percent zirconia or hafnia by weight in the dispersed colloidal particles from the relation:

(3) $$S = \frac{Z}{c(1 - 0.00825Z) + 0.00825Z}$$

where S is the percent $ZrO_2$ or $HfO_2$ in the dispersed phase and Z is the percent $ZrO_2$ or $HfO_2$ in the sol as measured by quantitative analysis.

As noted above, the percent of solids in the dispersed phase, S, is at least 30 for products of the invention. The value of S, as calculated by the above relationship, is in the range of 45 to 80 for preferred products of the invention. It is noted that the value of S of about 80 is equivalent to 100 because of errors in the assumption that the particle is spherical and because of the presence of a monolayer of water on the particle. Thus, with true spheres the value for S would be a maximum at about 90.

The concentration of aqua-sols of the invention can vary widely. Sols prepared as above described can be concentrated to 10 percent $ZrO_2$ or $HfO_2$ or more as desired. They can be concentrated to 50 percent $ZrO_2$, or $HfO_2$ or more without gelation particularly where the particle size is relatively large. It is generally preferred that the sols contain at least 10 percent $ZrO_2$ or $HfO_2$. Organo-sols can similarly be concentrated.

The zirconia:anion or hafnia:anion ratio of the preferred sols of the invention is in the range of 6:1 to 40:1. This corresponds to a preferred pH range of 2.5 to 5.

One of the preferred types of products of the invention is a stable, colloidal, zirconia or hafnia aquasol containing from 5 to 25 millimicron particles and having a pH in the range of 3 to 5. Such sols are stabilized with chloride or nitrate and contain more than 15 percent of solids. By stable sols is meant those which, on storage at room temperature for three months, do not increase in viscosity.

The sols of this invention are milky in appearance and at 0.25 percent solids concentration show a percent transmission, as measured on a Beckman Model DU spectrophotometer at a wave length of 400 millimicrons, in the range of 5 to 70 percent for sols containing relatively small particles and less than 5 percent for sols containing large particles.

Uses of the products

The sols and dry dispersible products of the invention can be used in a wide range of compositions. In a particular use one should select a sol which is compatible or else use the dry dispersible powder.

The powders can be incorporated in organic materials ranging, as shown, from organic solvents to organic plastic materials. Thus, they may be included in oils or as delustering agents in organic polymers in which their photocatalytic degradation effects will be less severe than those found for other fillers such as titanium dioxide. Thus, they can be used in nylon and in "Dacron" polyester fibers.

The products can be included in zirconium oxide-fused bodies to give extremely refractory materials as illustrated in Example 5. Hafnium oxide can similarly be used.

The products of the invention and particularly the dry dispersible powders can be included in paint compositions. They have a high refractive index similar to that of titanium dioxide. Thus, they can be used in water-base paints and in alkyd-resin paints. In paints it will be evident that either the dry dispersible powders or a sol or dispersion in a compatible vehicle can be used in the paint. Products of this invention are particularly useful in high-gloss enamels.

The products can be used as anti-soiling agents on rugs, fabrics, paper or on any other surface prone to soiling. Thus, a sol as prepared in Example 1 when diluted to 3 percent zirconia can be applied to rugs or upholstery fabrics and dried. Pronounced anti-soiling effects are obtained. Hafnia sols can similarly be used.

The products of the invention can be used to form ceramic-like coatings. Thus, mixtures of sols of the type described in Examples 1 and 2 can be evaporated on a metal to form a thick film. When fired at 1000 to 1500° C. this film is transformed into a ceramic-like, protective coating which is very adherent.

In order that the invention may be better understood reference should be had to the following illustrative examples:

*Example 1.*—A solution of 1 molar zirconium oxychloride with a Zr:Cl mol ratio of 1:1.89 was heated in a glass-lined steel autoclave to 200° C. for 4 hours. On cooling and centrifuging, a precipitate was recovered which analyzed about 40 percent solids. This precipitate was diluted to 25 percent solids with distilled water. The resulting slurry was then deionized by adding 2 percent of a cation exchange resin in hydrogen form and thereafter treating with an excess of an anion exchanger until the pH rose to 3.0. The cation exchanger used was "Nalcite" HCR, an aromatic hydrocarbon polymer containing nuclear sulfonic acid groups and it is of the general type described in D'Alelio U.S. Patent 2,366,007. The exchanger was added in a wet, drained state after degeneration with acid. The anion exchanger was regenerated, freshly washed and drained "Amberlite" IR-4B, which is a polyamine type.

The product obtained was a stable, colloidal zirconia sol containing about 25 percent of zirconia. The zirconia particles in the sol were about 10 millimicrons in diameter as shown by electron micrograph. The particles were dense and non-aggregated as shown by the relative viscosity, which was 3.0. The percent of solids, S, in the dispersed phase calculated as above described, was 55. The surface area was about 132 m.$^2$/g.

The product of this example appears similar to the product of Figure 2 when viewed in an electron micrograph except that the particles are slightly smaller than those shown in the figure.

A sol prepared as in this example, but at a concentration of 14 percent solids, had a zirconia to chloride ratio of 18:1 at a pH 3.0. A percent solids, S, of 54 and a percent transmission of 59 when diluted to 0.25 percent. This sol was stable on storage at room temperature.

*Example 2.*—A 0.5 molar zirconyl chloride solution was prepared by dissolving 644 g. $ZrOCl_2 \cdot 8H_2O$ in water and diluting to 4 liters. This solution was deionized to pH 3.1 by stirring it with an excess of anion exchange resin, freshly washed "Amberlite" IR-4B, in the regenerated form. The partly deionized solution had a Zr:Cl mol ratio estimated to be 1:1. This sol was autoclaved for 4 hours at 150° C., whereupon the pH dropped to 1.1. The autoclaved sol, after cooling to room temperature, was further deionized to pH 3.2, using "Amberlite" IR-4B, as above. The deionized sol was then concentrated to about 20 percent $ZrO_2$ solids by vacuum evaporation.

The percent of solids, S, in the dispersed phase was 66 when calculated as above described.

The product appears as in Figure 2 of the drawing as shown in an electron micrograph. The surface area is about 175 m.$^2$/g. It is noted that in Figure 2 the latex sphere, the large sphere within the circle, is a particle of a standardized latex emulsion. This has a diameter of 280 millimicrons and is introduced for purposes of comparing sizes.

*Example 3.*—Three liters of 0.13 molar $ZrO(NO_3)_2$ solution was autoclaved for 4 hours at 150° C. The zirconyl nitrate on analysis had a Zr:$NO_3$ mol ratio of 1:1.91. The resulting zirconia sol was cooled and its pH was found to be 0.92. To 2500 ml. of this sol there was added 500 grams of freshly washed "Amberlite" IR-4B and 100 grams of "Nalcite" HCR was thereafter added. The sol thus deionized had a pH of 4.8. It was then filtered through glass wool. 50 ml. of the undeionized zirconia sol was added to the filtered sol to lower the pH to 4.0. The sol was then concentrated by vacuum evaporation to 250 ml.

The product so obtained had the following characteristics: pH was 4.03; Zr:NO$_3$ ratio about 10:1; particle size by electron microscope about 10 millimicrons; percent ZrO$_2$ was 16; the percent of solids, S, in the dispersed phase as determined from viscosity was 47; surface area of a powder obtained by drying sol to ZrO$_2$ powder was 155 m.$^2$/g. When diluted to 0.3 percent solids, this sol had a percent transmission of 11 as measured on a Beckman Model DU spectrophotometer at a wave length of 400 millimicrons. The sol was stable for at least five months' storage at room temperature.

The product appeared in an electron micrograph about as the product of Figure 2 but its particles were somewhat larger. The particles of this product, however, were smaller than those of the product of Figure 1.

*Example 4.*—563 grams of basic zirconium nitrate was dissolved in water and diluted to 3 liters. The pH of the solution was 0.3 and the total weight was 3300 grams. This solution was autoclaved without stirring at 200° C. for 4 hours in a glass bottle which was placed inside a steel autoclave.

On cooling to room temperature the product was found to be a slurry of aggregated zirconia particles having a pH of 0.2. The product was centrifuged at 2,000 r.p.m. for 15 minutes in an International Centrifuge, size 3, Model FS, using 1.5 l. cups. 2800 grams of liquor was removed. The remaining wet cake, weighing about 500 grams, contained about 45 percent solids.

The viscosity of the wet cake was reduced by adding 100 grams of water. The resulting mixture was deionized by adding 24 grams of "Nalcite" HCR in the hydrogen form and 120 grams of freshly washed, carbonate regenerated "Amberlite" IR-4B. During deionization, the viscosity was reduced considerably, and after filtering through glass wool to remove the resin, a stable zirconia sol was obtained.

The sol contained zirconia particles 100 millimicrons in diameter as determined from the electron micrograph. Based on a particle size of 100 millimicrons the surface area of the particles in the sol is calculated to be 10 m.$^2$/g. It contained 39.2 percent of solids. Its pH was 3 and its relative viscosity 5.57. The ZrO$_2$:NO$_3$ mol ratio in the sol was approximately 35:1. The percent of solids, S, in the dispersed phase was calculated from the relative viscosity and found to be 70.

The product of this example is illustrated in Figure 1 of the drawing. In this figure there appears a latex particle of 280 millimicrons diameter. The appearance of the zirconia cubes will be evident upon inspection of the figure.

*Example 5.*—Three liters of 0.13 molar HfO(NO$_3$)$_2$ solution is autoclaved for 4 hours at 150° C. The hafnyl nitrate has an Hf:NO$_3$ mol ratio of 1:1.92. The resulting hafnia sol is cooled and its pH is 0.92. To 2500 ml. of this sol there is added 500 grams of freshly washed "Amberlite" IR-4B and 100 grams of "Nalcite" HCR is thereafter added. The sol thus deionized has a pH of 4.8. It is then filtered through glass wool. 50 ml. of the undeionized hafnia sol is added to the filtered sol to lower the pH to 4.0. The sol is then concentrated by vacuum evaporation to 250 ml.

The product has the following characteristics: pH 3.8; Hf:NO$_3$ ratio about 10:1; particle size by electron microscope about 10 millimicrons; percent HfO$_2$ is 16; the percent of solids, S, in the dispersed phase as determined from viscosity is 52; surface area of a powder obtained by drying sol to HfO$_2$ powder is 85 m.$^2$/g. When diluted to 0.3 percent solids, this sol has a percent transmission of 11 as measured on a Beckman Model DU spectrophotometer at a wave length of 400.

The product appears in an electron micrograph about as the product of Figure 2 but its particles are somewhat larger. The particles are smaller than those of the product of Figure 1.

*Example 6.*—A zirconia refractory material was prepared from zirconia sols of this invention and zirconia grain. Zirconia sand was ground to a size of about 2 to 50 microns. To 17 grams of this ground zirconia there was added 8 grams of zirconia in the form of an aquasol prepared as in Example 3 and 8 grams of zirconia also as an aquasol of the type described in Example 4. This wet mix was placed in a vacuum oven and dried at room temperature for 24 hours. The dried mass was then heated to 110° C. for an additional 24 hours. It was finally heated to 1500° C. to produce a very hard zirconia refractory.

Using a hafnia sol of Example 5 in similar amount a comparable hafnia refractory is obtained.

*Example 7.*—A zirconia sol in glycol was prepared from a zirconia sol made according to the invention by autoclaving one molar ZrOCl$_2$ at 125° C. for 4 hours, settling to recover the precipitated solids, diluting with water, and deionizing to about pH 5 with mixed anion-cation resins. The deionized zirconia sol was diluted with an equal volume of glycol and then fed into boiling glycol. Water was removed by distillation which was conducted under a blanket of nitrogen.

The final product was a fluid, very milky white sol which contained about 20 percent of solids. This product was used as a delusterant for "Dacron" polyester fiber.

Employing the same technique with HfOCl$_2$ under the same conditions, a similar product is obtained.

*Example 8.*—A zirconia sol was made in a process like that of Example 1 except that the 1 molar zirconium oxychloride solution was autoclaved at 125° C. The product was a zirconia sol containing 12 percent of solids. The sol had a relative viscosity of 1.415 which corresponds to a percent of solids, S, of 63. When diluted to 0.25 percent ZrO$_2$, the product had a percent transmission of 55 as measured on a Beckman Model DU spectrophotometer at a wave length of 400 millimicrons. The product appears in an electron micrograph about as in Figure 2. The surface area of the products is about 200 m.$^2$/g.

*Example 9.*—Under the conditions of the preceding example, a zirconia sol was prepared by autoclaving 0.2 molar ZrOCl$_2$ solution at 125° C. The resulting sol had a percent of solids, S, in the dispersed phase of 70, and when diluted to 0.25 percent solids, it had a percent transmission of 17.

*Example 10.*—A zirconia sol prepared according to Example 1 was deionized using an excess of a mixture of freshly washed "Amberlite" IR-4B (hydroxyl form) and "Nalcite" HCR (hydrogen form).

To 50 parts by weight of the deionized zirconia sol, containing 25 percent solids, there was added 250 parts of n-propanol. This mixture was fed into a heel of 80 parts by weight of n-propanol which was in a distilling pot, the pot being connected to an 18 plate bubble cap column. Water was removed by azeotropic distillation as rapidly as it was added with the zirconia aqua-organosol.

The resulting product was an anhydrous zirconia propanol sol containing about 15 percent solids. This sol was dried to give a powder. The powder can readily be dispersed in water which has been made slightly acidic with HCl.

A deionized hafnia sol can be prepared in the same way, first forming a hafnia sol following exactly the procedure of Example 1 and then deionizing as above. The hafnia sol can then be formed into an organosol as shown.

*Example 11.*—233 grams of zirconium tetrachloride are dissolved in water and diluted to one liter. The solution is autoclaved without stirring at 160° C. for 4 hours in a glass bottle which is placed inside a steel autoclave. On cooling to room temperature the product is a slurry of aggregated zirconia particles. The product is centrifuged at 2000 r.p.m. for 15 minutes in an International Centrifuge, size 3, Model FS. 920 grams of liquor are removed and the remaining wet cake weighs about 250 grams and contains about 49 percent solids.

The viscosity of the wet cake is reduced by adding 150 grams of water. The resulting mixture is deionized by adding 25 grams of "Nalcite" HCR in the hydrogen form and 120 grams of freshly washed, carbonate regenerated "Amberlite" IR-45, a polyamine-type resin like "Amberlite" IR-4B but more inert to decomposition in acidic solutions. During deionization the viscosity is reduced considerably and after filtering through glass wool, to remove the resin, a stable zirconia sol is obtained. The sol contains zirconia particles 120 millimicrons in diameter as determined from the electron micrograph. It contains 31 percent of solids and the pH is 3.1. The percent solids in the dispersed phase is 70 percent as calculated from the relative viscosity.

Following the procedures of the above examples one can similarly make zirconia and hafnia sols using other zirconyl and hafnyl salts as starting materials.

This application is a continuation-in-part of our co-pending applications Serial Number 483,973, filed January 25, 1955, and Serial Number 566,969, filed February 21, 1956, both now abandoned.

We claim:

1. An aquasol of an oxide of a metal selected from the group consisting of zirconium and hafnium, the sol having an average particle size from 5 to 200 millimicrons and being characterized by the fact that the percent of solids in the dispersed phase is at least 30.

2. A zirconia aquasol of particles of average size from 5 to 200 millimicrons in which the percent of solids in the dispersed phase is at least 30.

3. A zirconia aquasol of particles in which the ultimate particles are from 5 to 200 millimicrons in diameter and having a surface area of from 5 to 400 m.$^2$/g., the sols containing at least 10 percent of zirconia, the percent of solids in the dispersed phase being at least 30 having a pH of 2.5 to 5, and being stabilized with an anion selected from the group consisting of chloride and nitrate.

4. A zirconia aquasol of particles in which the ultimate particles are from 5 to 200 millimicrons in diameter and having a surface area of from 5 to 400 m.$^2$/g., the sols containing at least 10 percent of zirconia, the percent of solids in the dispersed phase being at least 30, and the pH being from 2.5 to 5.

5. In a process for preparing a sol of an oxide of a metal selected from the group consisting of zirconium and hafnium, the steps comprising heating an aqueous solution of a salt of the group consisting of zirconyl and hafnyl salts under the following conditions:

Mol ratio of anion:metal of 0.5:1 to 4:1
Temperature of 120 to 300° C.

to form colloidal particles of the oxide of the metal in an aqueous medium, cooling the particles and the aqueous medium to room temperature, and thereafter lowering the hydrogen ion content of said aqueous medium until its pH is in the range from 2 to 6.

6. In a process for preparing a zirconia sol, the steps comprising heating an aqueous solution of a zirconyl salt under the following conditions:

Mol ratio of anion:zirconium of 0.5:1 to 4:1
Temperature of 120 to 300° C.

to form colloidal zirconia particles in an aqueous medium, cooling the particles and the aqueous medium to room temperature, and thereafter lowering the hydrogen ion content of said aqueous medium until its pH is in the range from 2 to 6.

7. In a process for preparing a zirconia sol, the steps comprising heating an aqueous solution of a zirconyl salt under the following conditions:

Mol ratio of anion:zirconium of 1:1 to 2:1
Temperature of 120 to 150° C.
Zirconyl ion concentration of 0.1 to 2 molar to form colloidal zirconia particles in an aqueous medium, cooling the particles and the aqueous medium to room temperature, and thereafter lowering the hydrogen ion content of said aqueous medium until its pH is in the range from 2 to 6.

8. In a process for preparing a zirconia sol, the steps comprising heating an aqueous solution of a zirconyl salt under the following conditions:

Mol ratio of anion:zirconium of 1:1 to 2:1
Temperature 120 to 150° C.
Zirconyl ion concentration of 0.1 to 2 molar to form colloidal zirconia particles in an aqueous medium, and cooling the particles and the aqueous medium to room temperature, and thereafter lowering the hydrogen ion content of said aqueous medium until its pH is in the range from 2 to 6, and concentrating to at least 25 percent $ZrO_2$.

9. In a process for preparing a sol of an oxide of a metal selected from the group consisting of zirconium and hafnium, the steps comprising heating an aqueous solution of a salt of the group consisting of zirconyl and hafnyl salts under the following conditions:

Mol ratio of anion:metal of 0.5:1 to 4:1
Temperature of 120 to 300° C.

to form colloidal particles of the oxide of the metal in an aqueous medium, cooling the particles and the aqueous medium to room temperature, and thereafter lowering the hydrogen ion content of the heated product by dialyzing out acid until the pH is in the range of from 2 to 6.

10. In a process for preparing a sol of an oxide of a metal selected from the group consisting of zirconium and hafnium, the steps comprising heating an aqueous solution of a salt of the group consisting of zirconyl and hafnyl salts under the following conditions:

Mol ratio of anion:metal of 0.5:1 to 4:1
Temperature of 120 to 300° C.

to form colloidal particles of the oxide of the metal in an aqueous medium cooling the particles and the aqueous medium to room temperature, and thereafter lowering the hydrogen ion content of the heated product by ion exchange until the pH is in the range of from 2 to 6.

References Cited in the file of this patent

UNITED STATES PATENTS

| | | |
|---|---|---|
| Re. 16,956 | Blumenfeld | May 8, 1928 |
| 1,816,006 | Easter | July 28, 1931 |
| 1,906,148 | Gardner | Apr. 25, 1933 |
| 2,438,230 | Ryznar | Mar. 23, 1948 |
| 2,467,089 | Marisic et al. | Apr. 12, 1949 |
| 2,567,661 | Ayres | Sept. 11, 1951 |
| 2,769,718 | Ault | Nov. 6, 1956 |
| 2,771,376 | Capellman | Nov. 20, 1956 |
| 2,773,776 | Weidman | Dec. 11, 1956 |

OTHER REFERENCES

Weiser: "Inorganic Colloid Chemistry," vol. II, "The Hydrous Oxides and Hydroxides," John Wiley and Sons (1935), pp. 267-271.